(12) United States Patent
Bahr et al.

(10) Patent No.: US 11,974,159 B1
(45) Date of Patent: Apr. 30, 2024

(54) SYSTEMS AND METHODS FOR REDUCING COMMUNICATION NETWORK CONGESTION

(71) Applicant: Cable Television Laboratories, Inc., Louisville, CO (US)

(72) Inventors: John C. Bahr, Superior, CO (US); Luther E. Smith, Fort Lupton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/649,813

(22) Filed: Feb. 3, 2022

Related U.S. Application Data

(60) Provisional application No. 63/145,386, filed on Feb. 3, 2021.

(51) Int. Cl.
  *H04W 28/02* (2009.01)
  *H04W 48/10* (2009.01)
  *H04W 88/10* (2009.01)

(52) U.S. Cl.
  CPC ....... *H04W 28/0252* (2013.01); *H04W 48/10* (2013.01); *H04W 88/10* (2013.01)

(58) Field of Classification Search
  None
  See application file for complete search history.

(56) References Cited

U.S. PATENT DOCUMENTS

| | | | | |
|---|---|---|---|---|
| 7,808,963 B2* | 10/2010 | Gupta | .................. | H04W 72/30 370/342 |
| 8,817,710 B2* | 8/2014 | Wang | .................... | H04W 48/16 370/329 |
| 9,608,864 B2* | 3/2017 | Sanderson | .............. | H04L 43/08 |
| 10,531,365 B2* | 1/2020 | Kaur | ..................... | H04W 48/10 |
| 10,616,765 B2* | 4/2020 | Ziv | ........................ | H04W 12/02 |
| 10,779,166 B2* | 9/2020 | Gloanec | .............. | H04L 63/0876 |
| 2005/0003765 A1* | 1/2005 | Alfano | .................. | H04W 48/18 455/39 |
| 2007/0074263 A1* | 3/2007 | Shimazu | .......... | H04N 21/42202 725/132 |
| 2013/0040638 A1* | 2/2013 | George | ................. | H04W 36/14 455/426.1 |
| 2013/0107788 A1* | 5/2013 | Cherian | ................ | H04W 48/12 370/312 |
| 2013/0281112 A1* | 10/2013 | Sabatelli | ............... | G01S 5/0027 455/456.1 |
| 2014/0003239 A1* | 1/2014 | Etemad | ................. | H04W 28/08 370/235 |

(Continued)

*Primary Examiner* — Khaled M Kassim
*Assistant Examiner* — Berhanu D Belete
(74) *Attorney, Agent, or Firm* — PdZ Patent Law, PLLC

(57) ABSTRACT

A method for reducing communication network congestion includes (1) obtaining, from a first communication device, a scan of a first communication channel for presence of a first network identifier, (2) determining, from the scan of the first communication channel, that the first network identifier is being broadcasted on the first communication channel by a communication device other than the first communication device, and (3) in response to determining that the first network identifier is being broadcasted on the first communication channel, inhibiting broadcasting of the first network identifier on the first communication channel by the first communication device.

16 Claims, 13 Drawing Sheets

(56) References Cited

U.S. PATENT DOCUMENTS

| | | | |
|---|---|---|---|
| 2016/0148638 A1* | 5/2016 | Ross | G11B 31/006 |
| | | | 386/228 |
| 2017/0245201 A1* | 8/2017 | Ong | H04W 48/10 |
| 2018/0006882 A1* | 1/2018 | Sanderson | H04L 43/08 |
| 2018/0063799 A1* | 3/2018 | Sadek | H04W 52/367 |
| 2019/0027184 A1* | 1/2019 | Ross | G11B 31/006 |
| 2019/0068305 A1* | 2/2019 | Su | H04H 20/08 |
| 2019/0075464 A1* | 3/2019 | Gloanec | H04L 63/0236 |
| 2020/0154348 A1* | 5/2020 | Choi | H04W 4/80 |
| 2021/0194757 A1* | 6/2021 | O'Reirdan | H04L 41/0668 |
| 2022/0132421 A1* | 4/2022 | Wang | H04W 48/08 |

\* cited by examiner

SYSTEMS AND METHODS FOR REDUCING COMMUNICATION NETWORK CONGESTION

CROSS REFERENCE TO RELATED APPLICATIONS

This application claims the benefit of priority to U.S. Provisional Patent Application Ser. No. 63/145,386, filed on Feb. 3, 2021, which is incorporated herein by reference.

BACKGROUND

Wireless communication networks are commonly used to provide wireless access to a backhaul communication link, including but not limited to, a Ethernet backhaul communication link, a cable backhaul communication link (e.g., a Data Over Cable Service Interface Specification (DOCSIS) communication link, a Multi-Media over Coax (MoCA) communication link, or a HomePNA (G.hn) communication link), an optical backhaul communication link (e.g., an Ethernet passive optical network (EPON) communication link, a radio frequency of over glass (RFOG or RFoG) communication link, a Gigabit-capable passive optical network (GPON) communication link, a free space optical communication link) or a wireless backhaul communication link (e.g., a satellite wireless communication link or a fixed wireless communication link). Examples of wireless communication networks include, but are not limited to, Wi-Fi wireless communication networks, cellular wireless communication networks, Bluetooth wireless communication networks, long range (LoRa) wireless communication networks, Zigbee wireless communication networks, and satellite wireless communication networks.

Wireless communication networks may use licensed radio frequency (RF) spectrum, unlicensed RF spectrum, or a combination of licensed and unlicensed RF spectrum. For example, cellular wireless communication networks traditionally used licensed RF spectrum, although cellular wireless communication networks are increasingly unlicensed RF spectrum. For instance, the 3 rd Generation Partnership Project (3GPP) Fifth Generation (5G) New Radio Unlicensed (NR-U) protocol supports cellular wireless communication in unlicensed RF spectrum. Wi-Fi wireless communication networks, LoRa wireless communication networks, and Zigbee wireless communication networks normally use unlicensed RF spectrum.

Wi-Fi wireless communication networks have become very popular, partly due to the relatively low-cost and wide availability of Wi-Fi hardware. For example, residences and businesses often have private Wi-Fi wireless communication networks to provide wireless communication services within their premises. As another example, communication service providers and other parties are increasingly operating community Wi-Fi wireless communication networks that may be available for use by multiple parties, such as by subscribers of a communication service provider or customers of a business. Community Wi-Fi wireless communication networks are supported by multiple wireless access points. For example, a community Wi-Fi wireless communication network operated by a communication service provider may be supported by wireless access points at subscribers' premises. These wireless access points often serve a dual role of supporting private Wi-Fi wireless communication networks as well as public Wi-Fi wireless communication networks.

Each wireless access point in a Wi-Fi wireless communication network conventionally broadcasts a network identifier in the form of a service set identifier (SSID) for each Wi-Fi wireless communication network supported by the wireless access point, where each SSID identifies its respective Wi-Fi wireless communication network. For example, assume that a wireless access point in a residence supports both a private Wi-Fi wireless communication network and a community Wi-Fi wireless communication network. The wireless access point conventionally broadcasts two SSIDs, where one SSID identifies the private Wi-Fi wireless communication network of the residence and the other SSID identifies the community Wi-Fi wireless communication network. A SSID is used, for example, to identify availability of an associated Wi-Fi wireless communication network to potential wireless clients.

DETAILED DESCRIPTION OF THE EMBODIMENTS

Figure 1:
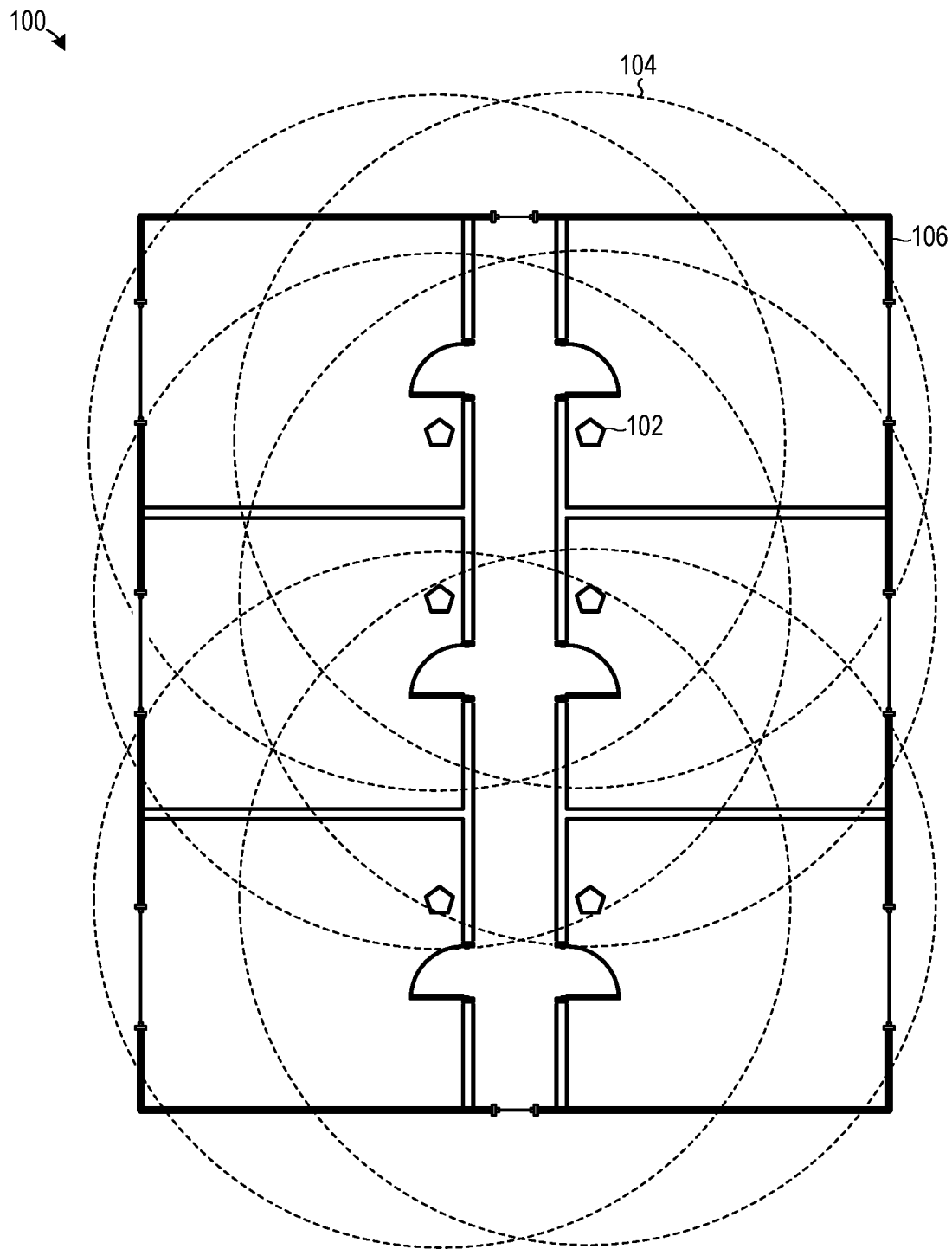
FIG. 1 is an illustration of a wireless communication environment including wireless access points with overlapping coverage areas.

It is common for wireless access points forming a public wireless communication network to have overlapping coverage areas. For example, FIG. 1 is an illustration of a wireless communication environment 100 including six wireless access points 102 having respective coverage areas 104 within a building 106. Building 106, which is illustrated by its floor plan in FIG. 1, is, for example, a multi-dwelling unit (MDU) or an office building. Only one wireless access point 102 and only one coverage area 104 are labeled in FIG. 1 for illustrative clarity. As evident from FIG. 1, coverage areas 104 substantially overlap. Although coverages areas 104 are illustrated as having circular shapes, actual coverage areas may be, and often will be, non-circular. For example, walls and other building features may attenuate radio frequency (RF) signals, such that wireless access points 102 have irregular coverage areas. As another example, wireless access points 102 may have non-isotropic antennas which cause them to have non-circular coverage areas. Irrespective of coverage area shape, coverage areas 104 are likely to overlap due to the proximity of wireless access points 102 to each other in building 106.

Assume that each wireless access point 102 supports a community wireless communication network as well as a respective private wireless communication network. Each wireless access point 102 will conventionally broadcast a common network identifier (e.g., an SSID) for the community wireless communication network, as well as a unique network identifier for its respective private wireless communication network. Consequently, there will be substantial overlap of wireless communication signals carrying the same network identifier, i.e., the network identifier for the community Wi-Fi wireless communication network. Although such overlap is beneficial in that it helps ensure that the network identifier is widely available in building 106, there are drawbacks to the overlapping network identifier communication signals. For example, each broadcasted network identifier requires wireless communication network airtime for broadcasting the wireless communication signal carrying the network identifier, and communication network airtime is a finite resource due to RF spectrum constraints and limitations on how much data can be transmitted via available RF spectrum. As such, unnecessary broadcasting of a community wireless communication network identifier may contribute to wireless communication congestion by reducing availability of communication network airtime for transmitting payload data. Additionally, energy is required to broadcast a network identifier, and broadcasting a community network identifier at more locations than required may therefore waste energy.

Disclosed herein are systems and methods for reducing communication network congestion which at least partially overcome the above discussed drawbacks of conventional network identifier broadcasting. Certain embodiments of the new systems and methods advantageously help minimize broadcasting of a network identifier (e.g., an SSID), such as by inhibiting broadcasting of the network identifier by a given communication device (e.g., a wireless access point), when the network identifier is already being broadcasted by another communication device (e.g., another wireless access point) on a given communication channel. Additionally, certain embodiments are configured to permit broadcasting of a network identifier (e.g., an SSID), when the network identifier is not already being broadcasted by another communication device (e.g., another wireless access point) on a given communication channel. Consequently, the new systems and methods help minimize communication network congestion and associated energy usage, while still achieving adequate broadcasting of communication signals carrying network identifiers.

In this document, "inhibiting" broadcasting of a network identifier (e.g., an SSID) may include any of (a) causing a communication device to not begin broadcasting the network identifier on a given communication channel, (b) causing the communication device to stop broadcasting the network identifier on the given communication channel, and (c) causing the communication device to reduce a frequency of broadcasting of the network identifier on the given communication channel. Additionally, in this document, "permitting" broadcasting of a network identifier (e.g., an SSID) may include any of (a) causing a communication device to begin broadcasting the network identifier on a given communication channel, (b) causing the communication device to resume broadcasting the network identifier on the given communication channel, and (c) causing the communication device to increase a frequency of broadcasting of the network identifier on the given communication channel.

Figure 2:
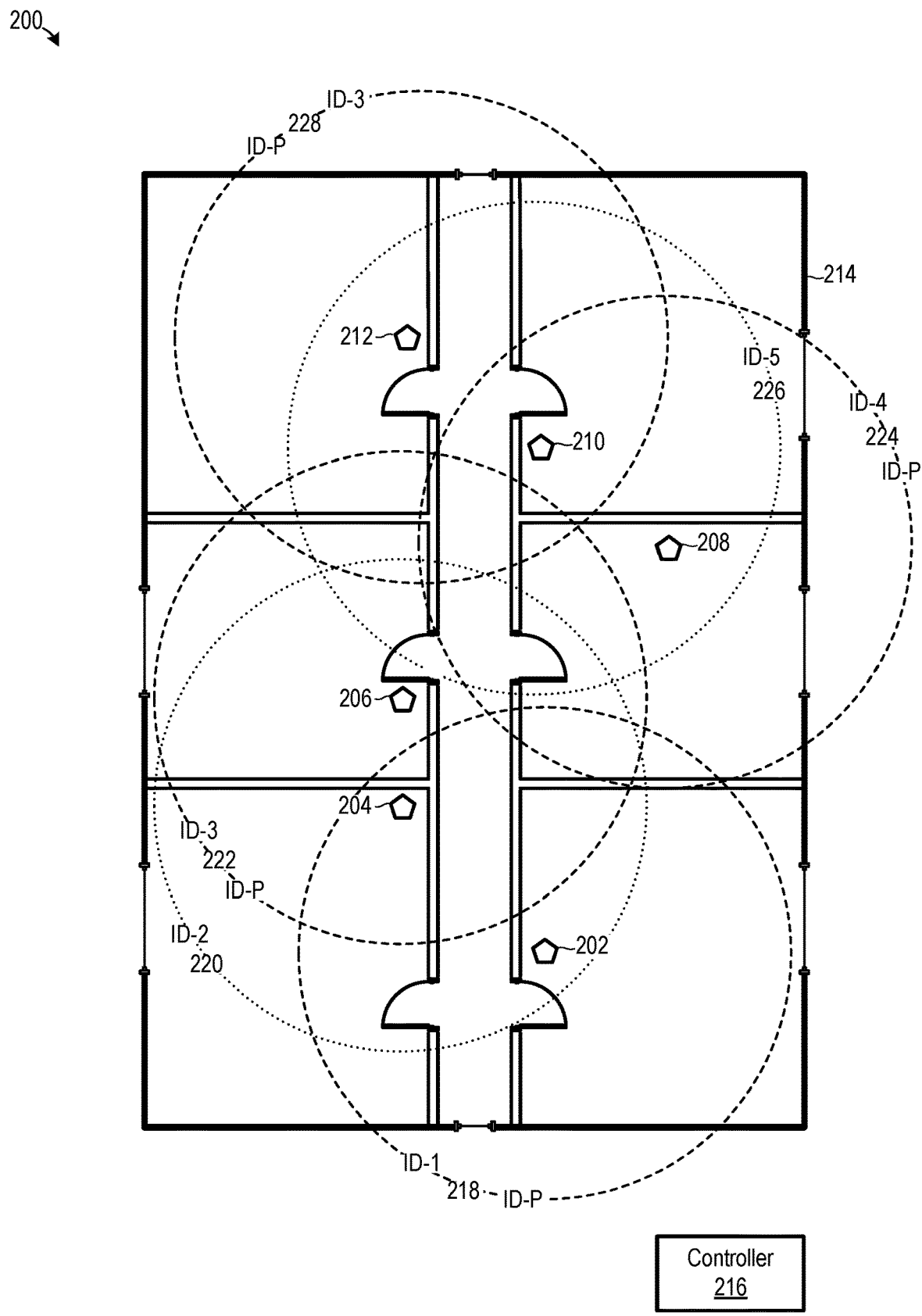
FIG. 2 is an illustration of a wireless communication environment including a system for reducing communication system congestion, according to an embodiment.

FIG. 2 is a schematic diagram of a communication environment 200 including wireless access points 202, 204, 206, 208, 210, and 212, a building 214, and a controller 216.

In certain embodiments, wireless access points 202, 204, 206, 208, 210, and 212 provide wireless access to a backhaul communication link (not shown), including but not limited to, a Ethernet backhaul communication link, a cable backhaul communication link (e.g., a Data Over Cable Service Interface Specification (DOCSIS) communication link, a Multi-Media over Coax (MoCA) communication link, or a HomePNA (G.hn) communication link), an optical backhaul communication link (e.g., an Ethernet passive optical network (EPON) communication link, a radio frequency of over glass (RFOG or RFoG) communication link, a Gigabit-capable passive optical network (GPON) communication link, a free space optical communication link) or a wireless backhaul communication link (e.g., a satellite wireless communication link or a fixed wireless communication link).

Wireless access points 202, 204, 206, 208, 210, and 212 may be Wi-Fi wireless access points. In this document, "Wi-Fi" refers to a wireless communication technology at least partially based on one or more of (a) an Institute of Electrical and Electronics Engineers (IEEE) 802.11 protocol, (b) an extension of an IEEE 802.11 protocol, (c) a modification of an IEEE 802.11 protocol, (d) a substitute for an IEEE 802.11-based protocol, and (e) a successor of an IEEE 802.11 protocol (e.g., a future wireless communication protocol replacing an IEEE 802.11 protocol). However, wireless access points 202, 204, 206, 208, 210, and 212 are not limited to being Wi-Fi wireless access points. For example, in some embodiments, wireless access points 202, 204, 206, 208, 210, and 212 are cellular wireless access points, including but not limited to, cellular wireless access points operating according to a 3rd Generation Partnership Project (3GPP) communication protocol (e.g., a long-term evolution (LTE) communication protocol, a fifth generation (5G) communication protocol, a sixth generation (6G) communication protocol, a citizens broadband radio service (CBRS) communication protocol, etc.). In embodiments where wireless access points 202, 204, 206, 208, 210, and 212 are cellular wireless access points, the wireless access points may operate in licensed RF spectrum and/or unlicensed RF spectrum.

Wireless access points 202, 204, 206, 208, 210, and 212 may take alternative forms without departing from the scope hereof. For example, in some embodiments, wireless access points 202, 204, 206, 208, 210, and 212 are configured to operate according to one or more of a Bluetooth wireless communication protocol, a long range (LoRa) wireless communication protocol, a Zigbee wireless communication protocol, and similar wireless communication protocols. Wireless access points 202, 204, 206, 208, 210, and 212 may be incorporated in other devices. In some embodiments, one or more of wireless access points 202, 204, 206, 208, 210, and 212 are Internet of Things (IoT) devices.

Building 214, which is illustrated by its floor plan in FIG. 2, includes wireless access points 202, 204, 206, 208, 210, and 212. In some embodiments, building 214 is a MDU or a business, although building 214 is not limited to these types of buildings. The number of wireless access points in building 214, as well as the locations of wireless access points in building 214, may vary.

Controller 216 is configured to instruct or control wireless access points 202, 204, 206, 208, 210, and 212 to perform one or more embodiments of the new methods for reducing communication network congestion. Accordingly, controller 216 is one embodiment of the new systems for reducing communication network congestion disclosed herein. Controller 216 may be configured to perform additional functions without departing from the scope hereof. Although controller 216 is illustrated as being a single element, controller 216 may include multiple constituent elements which need not be collocated.

Controller 216 is at least partially implemented, for example, by electronic circuitry (e.g., analog and/or digital electronic circuitry), instructions (e.g., software and/or firmware) stored in one or more data stores and being executed by one or more processors, optical computing devices, and/or quantum computing devices. While controller 216 is depicted as being separate from wireless access points 202, 204, 206, 208, 210, and 212, controller 216 could be partially or fully integrated in one or more of these wireless access points. For example, some embodiments of wireless access points 202, 204, 206, 208, 210, and 212 include a respective instance of controller 216, such that each wireless access point is configured to execute an embodiment of the new methods disclosed herein. In some other embodiments, controller 216 is remote from wireless access points 202, 204, 206, 208, 210, and 212, and controller 216 is configured, for example, as a central controller in or near building 214. In certain other embodiments, controller 216 is remote from building 214, such as in a network hub operated by a communication service provider. In yet other embodiments, controller 216 is at least partially implemented by a distributed computing system, such as a cloud computing system.

Wireless access points 202, 204, 206, 208, 210, and 212 have respective coverage areas 218, 220, 222, 224, 226, and 228 as symbolically shown by dashed lines in FIG. 2. Although coverages areas 218, 220, 222, 224, 226, and 228 are illustrated as having circular shapes, actual coverage areas may be, and often will be, non-circular, for reasons analogous to those discussed above with respect to FIG. 1. Wireless access points 202, 204, 206, 208, 210, and 212 are configured to support private wireless communication networks having respective network identifiers ID-1, ID-2, ID-3, ID-4, ID-5, and ID-6, as illustrated in FIG. 2 by coverage areas 218, 220, 222, 224, 226, and 228 being labeled with the network identifier of their respective wireless access point. Additionally, each wireless access point 202, 204, 206, 208, 210, and 212 is configured to support a community wireless communication network having a network identifier ID-P. Each network identifier ID-1, ID-2, ID-3, ID-4, ID-5, ID-6, and ID-P identifies a corresponding wireless communication network supported by a wireless access point broadcasting the network identifier. For example, in embodiments where wireless access points 202, 204, 206, 208, 210, and 212 are Wi-Fi wireless communication networks, each network identifier ID-1, ID-2, ID-3, ID-4, ID-5, ID-6, and ID-P may be SSID for a respective Wi-Fi wireless communication network.

In this document, a "community" communication network is a communication network supported by multiple communication devices (e.g., by multiple wireless access points), and the term "community" need not require that the communication network be available for unrestricted use. For example, a wireless communication network in a hotel that is supported by multiple wireless access points and is restricted to use by hotel guests may be considered a community wireless communication network. As another example, a wireless communication network in a home supported by multiple wireless access points may be considered a community wireless communication network. As yet another example, a wireless communication network supported by wireless access points in multiple buildings in a given geographic area may also be considered a community wireless communication network.

Importantly, although each wireless access point 202, 204, 206, 208, 210, and 212 is configured to support the community wireless communication network, controller 216 is configured to inhibit broadcasting of network identifier ID-P by one or more of the wireless access points, to help prevent unnecessary broadcasting of network identifier ID-P by two or more wireless access points having overlapping coverage areas. For example, in the FIG. 2 example, controller 216 controls wireless access points 202, 204, 206, 208, 210, and 212 such that (a) broadcasting of network identifier ID-P is permitted for access points 202, 206, 208, and 212, and (b) broadcasting of network identifier ID-P is inhibited for access points 204 and 210. Consequently, each of wireless access points 202, 206, 208, and 212 broadcasts network identifier ID-P, as symbolically shown in FIG. 2 by their respective coverage areas 218, 222, 224, and 228 being illustrated in heavy dashed lines and labeled with ID-P. Additionally, wireless access points 204 and 210 do not broadcast network identifier ID-P, as symbolically shown in FIG. 2 by their respective coverage areas 220 and 226 being illustrated in light dashed lines and not labeled with ID-P.

The action of controller 216 of controlling or instructing wireless access points 204 and 210 to not broadcast network identifier ID-P helps prevent (a) congestion in communication environment 200 by reducing use of communication network airtime for broadcasting network identifier ID-P and (b) power consumption by wireless access points 204 and 210 associated with broadcasting network identifier ID-P. Additionally, network identifier ID-P is still widely available in building 214 even though the network identifier is not being broadcasted by every wireless access point in building 214. Furthermore, reducing broadcasting of network identifier ID-P not only helps reduce congestion on the wireless communication network corresponding to ID-P, but it may also reduce congestion on other wireless communication networks sharing a common radio and/or frequency band with the wireless communication network corresponding to ID-P. Accordingly, controller 216 helps minimize congestion and power consumption in communication environment 200 without significantly impairing operation of the community wireless communication network associated with network identifier ID-P.

While controller 216 inhibits broadcasting of network identifier ID-P in wireless access points 204 and 210 in the FIG. 2 example, controller 216 could alternately inhibit broadcasting of network identifier ID-P in one or more different wireless access points in building 214 while still achieving advantageous results similar to those discussed above. For example, in an alternate embodiment, controller 216 controls wireless access points 202, 204, 206, 208, 210, and 212 such that (a) network identifier ID-P broadcasting is permitted for access points 204 and 210 (*b*) network identifier ID-P broadcasting is inhibited for access points 202, 206, 208, and 212. Such alternate method of controlling network identifier ID-P broadcasting in building 214 significantly reduces congestion associated with overlapping network identifier ID-P signal broadcasting while still providing substantial coverage of building 214 with communication signals carrying network identifier ID-P.

The FIG. 2 example assumes that wireless access points 202, 204, 206, 208, 210, and 212 are operating on a common wireless communication channel when broadcasting network identifiers. However, some embodiments of controller 216 are further configured to help reduce communication network congestion and promote high community wireless communication performance by broadcasting network identifier ID-P on a plurality of wireless communication channels. For example, assume that (a) wireless access point 204 scans a first wireless communication channel for presence of network identifier ID-P, and (b) wireless access point 204 determines that network identifier ID-P is already broadcasted on the first wireless communication channel by another wireless access point, such as by wireless access point 202 and/or wireless access point 206. In response to this scenario, certain embodiments of controller 216 control wireless access point 204 to (a) inhibit broadcasting of network identifier ID-P on the first wireless communication channel and (b) permit broadcasting of network identifier ID-P on a second wireless communication channel. Such broadcasting of ID-P on the second wireless communication channel instead of on the first wireless communication channel helps reduce congestion on the first wireless communication channel while promoting availability of network identifier ID-P via the second wireless communication channel. In certain embodiments, controller 216 conditions permitting broadcasting of network identifier ID-P on the second wireless communication channel on wireless access point 204 determining that network identifier ID-P is not already being broadcasted on the second wireless communication channel by another wireless access point.

Certain embodiments of controller 216 are further configured to condition inhibiting broadcasting of network identifier ID-P by a given wireless access point on one or more criteria in addition to whether the network identifier ID-P is already being broadcasted by another wireless access point. For example, particular embodiments of controller 216 are further configured to condition inhibiting broadcasting of network identifier ID-P by a given wireless access point on one or more of (a) a communication signal carrying network identifier ID-P having a received signal strength of at least a threshold value at the wireless access point, (b) that the wireless access point is not currently serving any client of the public wireless network corresponding to network identifier ID-P, and (c) that the wireless access point has not previously served any client of the public wireless network corresponding to network identifier ID-P within a predetermined amount of time.

FIGS. 3-7B, discussed below, illustrate several example methods of how controller 216 might inhibit or permit broadcasting of a network identifier. It is appreciated, however, that controller 216 is not limited to operating according to these example methods. Additionally, the methods of FIGS. 3-7B could be implemented by devices other than controller 216, as well as in communication environments other than communication environment 200, without departing from the scope hereof.

Figure 3:
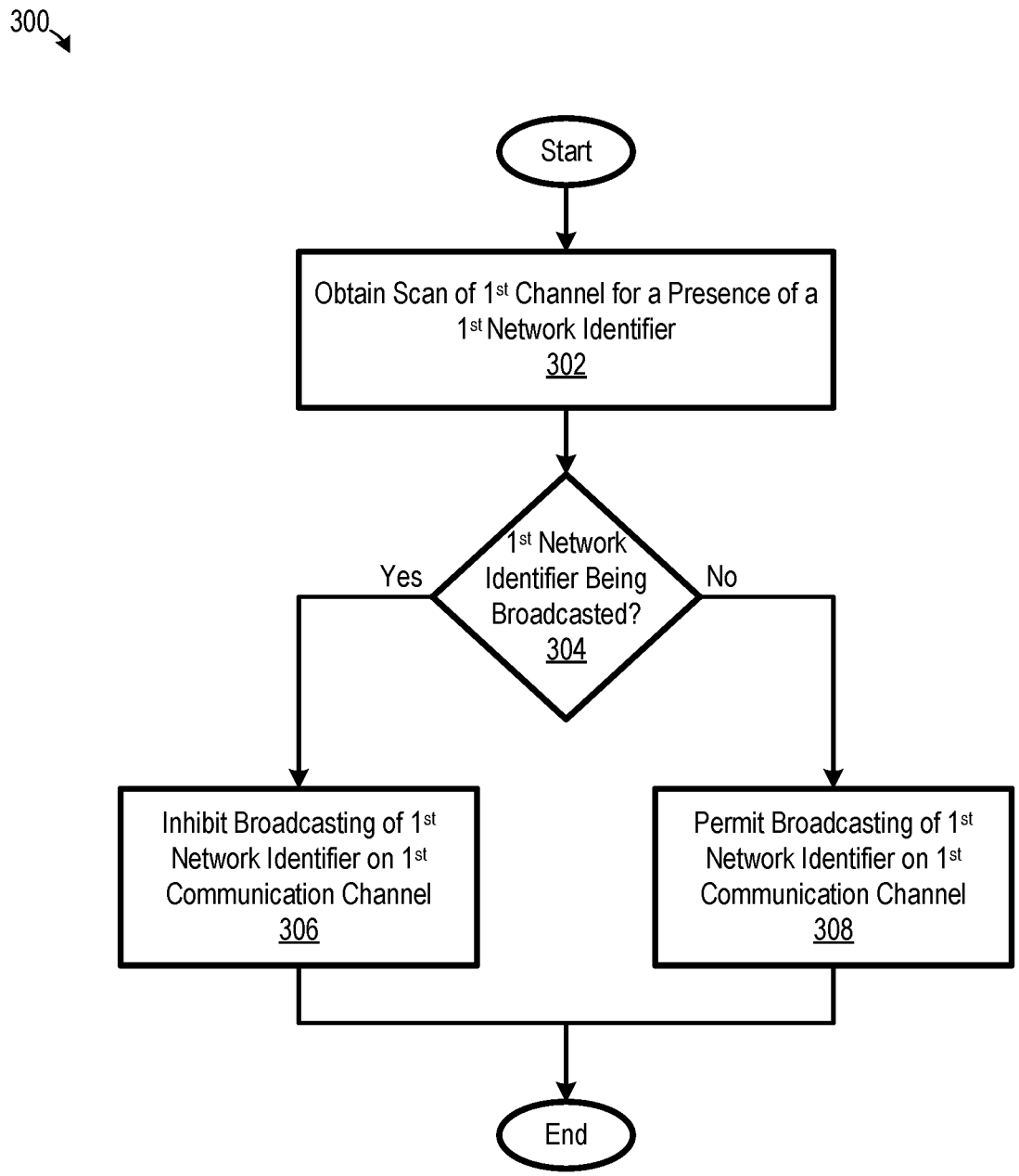
FIG. 3 is a flow chart of a method for reducing communication network congestion, according to an embodiment.

FIG. 3 is a flow chart of a method 300 for reducing communication network congestion. In a block 302 of method 300, a scan of a first communication channel is obtained from a communication device (e.g., a wireless access point) for presence of a first network identifier (e.g., a SSID). In one example of block 302, a scan of a first wireless communication channel is obtained from wireless access point 210 for presence of network identifier ID-P. In a decision block 304, method 300 determines, from the block 302 scan, whether the first network identifier is being broadcasted on the first communication channel. In one example of decision block 304, controller 216 determines from the scan of block 302 that network identifier ID-P is already being broadcasted on the first wireless communication channel, such as by wireless access point 208 and/or by wireless access point 212. In another example of decision block 304, controller 216 determines from the scan of block 302 that network identifier ID-P is not already being broadcasted on the first wireless communication channel. If the result of decision block 304 is yes, method 300 proceeds to a block 306, and if the result of decision block 304 is no, method 300 proceeds to a block 308.

In block 306, method 300 inhibits broadcasting of the first network identifier on the first communication channel by the communication device. In one example of block 306, controller 216 inhibits broadcasting of network identifier ID-P on the first wireless communication channel by wireless access point 210. In block 308, method 300 permits broadcasting of the first network identifier on the first communication channel by the communication device. In one example of block 308, controller 216 permits broadcasting of network identifier ID-P on the first wireless communication channel by wireless access point 210. In some embodiments, controller 216 executes method 300 periodically and/or in response to occurrence of an event (e.g., power up of a wireless access point, initialization of a wireless access point, change in an operating environment of a wireless access point, enabling of the first network identifier, change in operating channel of a wireless access point, etc.).

Figure 4:
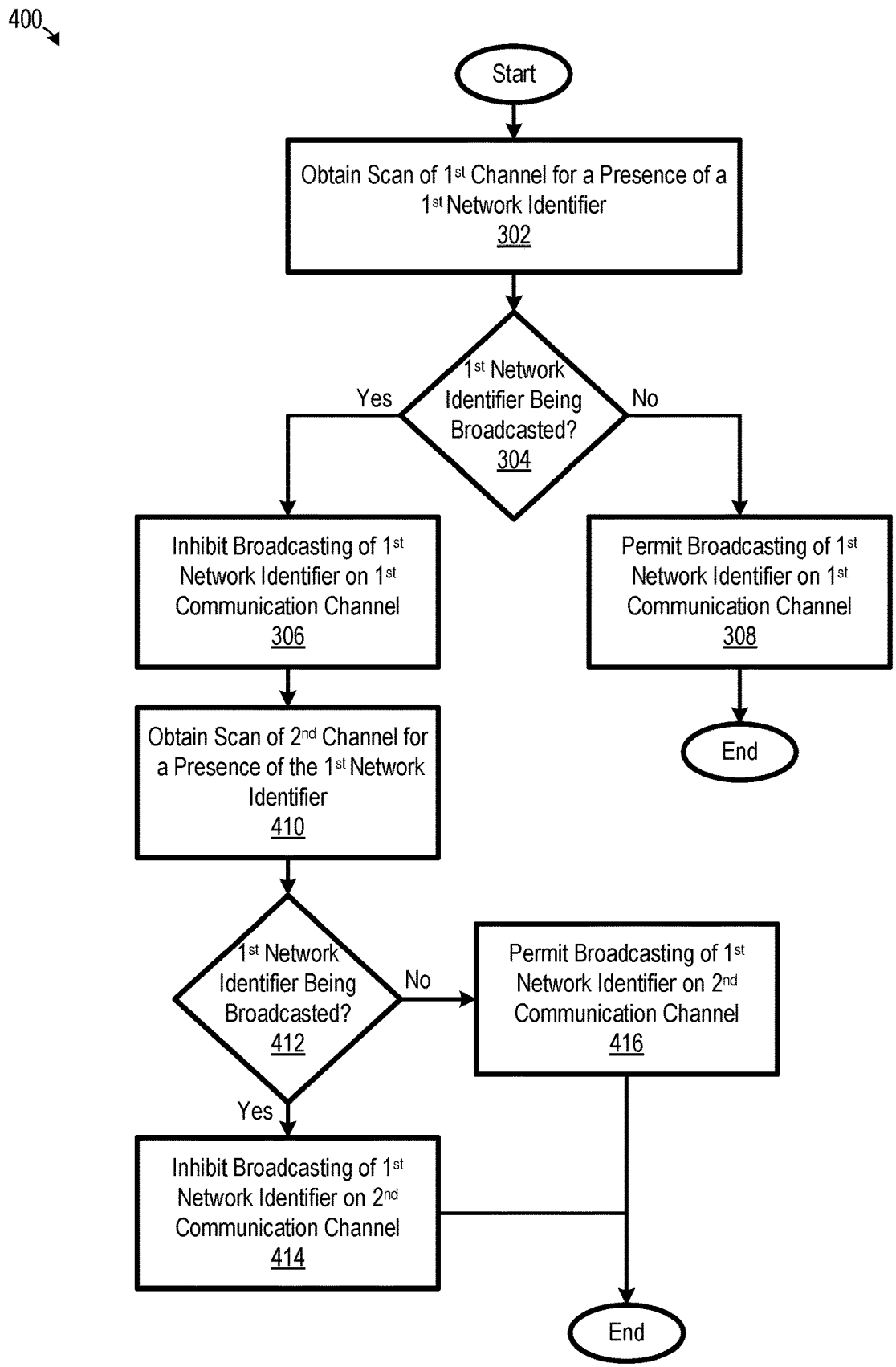
FIG. 4 is a flow chart of an alternate embodiment of the FIG. 3 method.

FIG. 4 is a flow chart of a method 400, which is an alternate embodiment of method 300 of FIG. 3. Method 400 is like method 300 but further includes blocks 410-416. Blocks 302-308 of method 400 are performed in the same manner as discussed above with respect to method 300. However, method 400 proceeds from block 306 to block 410 where a scan of a second wireless communication channel is obtained from the communication device for presence of the first network identifier. In one example of block 410, a scan of a second wireless communication channel is obtained from wireless access point 210 for presence of network identifier ID-P. In a decision block 412, method 400 determines, based on the block 410 scan, whether the first network identifier is being broadcasted on the second communication channel. In one example of decision block 412, controller 216 determines from the scan of block 410 that network identifier ID-P is already being broadcasted on the second wireless communication channel, such as by wireless access point 208 and/or by wireless access point 212. In another example of decision block 412, controller 216 determines from the scan of block 410 that network identifier ID-P is not already being broadcasted on the second wireless communication channel. If the result of decision block 412 is yes, method 400 proceeds to block 414, and if the result of decision block 412 is no, method 400 proceeds to block 416.

In block 414, method 400 inhibits broadcasting of the first network identifier on the second communication channel by the communication device. In one example of block 414, controller 216 inhibits broadcasting of network identifier ID-P on the second wireless communication channel by wireless access point 210. In block 416, method 400 permits broadcasting of the first network identifier on the second communication channel by the communication device. In one example of block 416, controller 216 permits broadcasting of network identifier ID-P on the second wireless communication channel by wireless access point 210.

In some embodiments, controller 216 executes method 400 periodically and/or in response to occurrence of an event (e.g., power up of a wireless access point, initialization of a wireless access point, change in an operating environment of a wireless access point, enabling of the first network identifier, change in operating channel of a wireless access point, etc.). Additionally, method 400 could be modified to potentially permit broadcasting of the first network identifier on one or more communication channels in addition to those scanned in blocks 302 and 410, by replicating blocks 410-416 for each additional wireless communication channel or by repeating blocks 410-416 for each additional wireless communication channel.

Figure 5A:
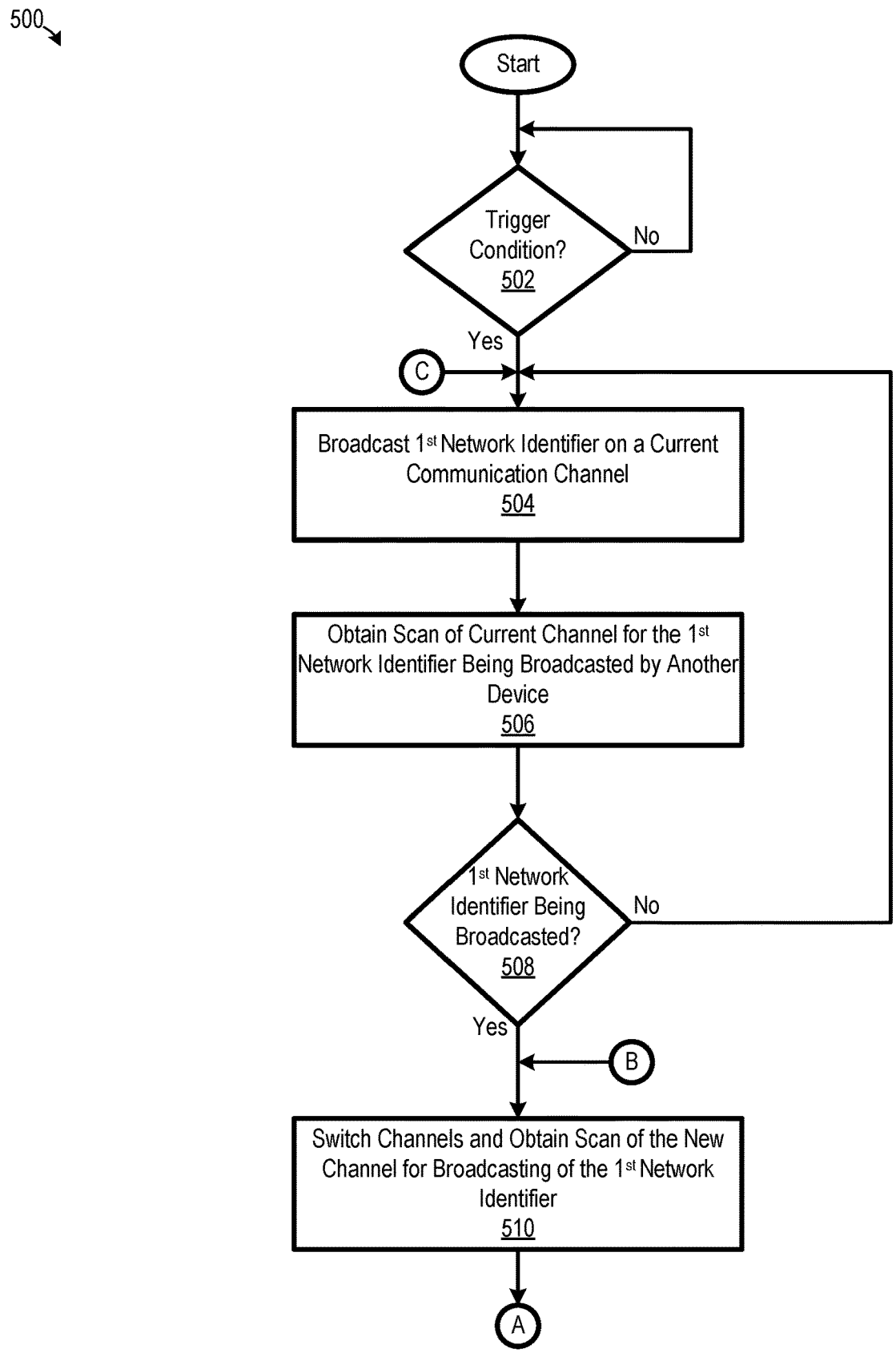
FIGS. 5A and 5B are a flow chart of another method for reducing communication network congestion, according to an embodiment.
Figure 5B:
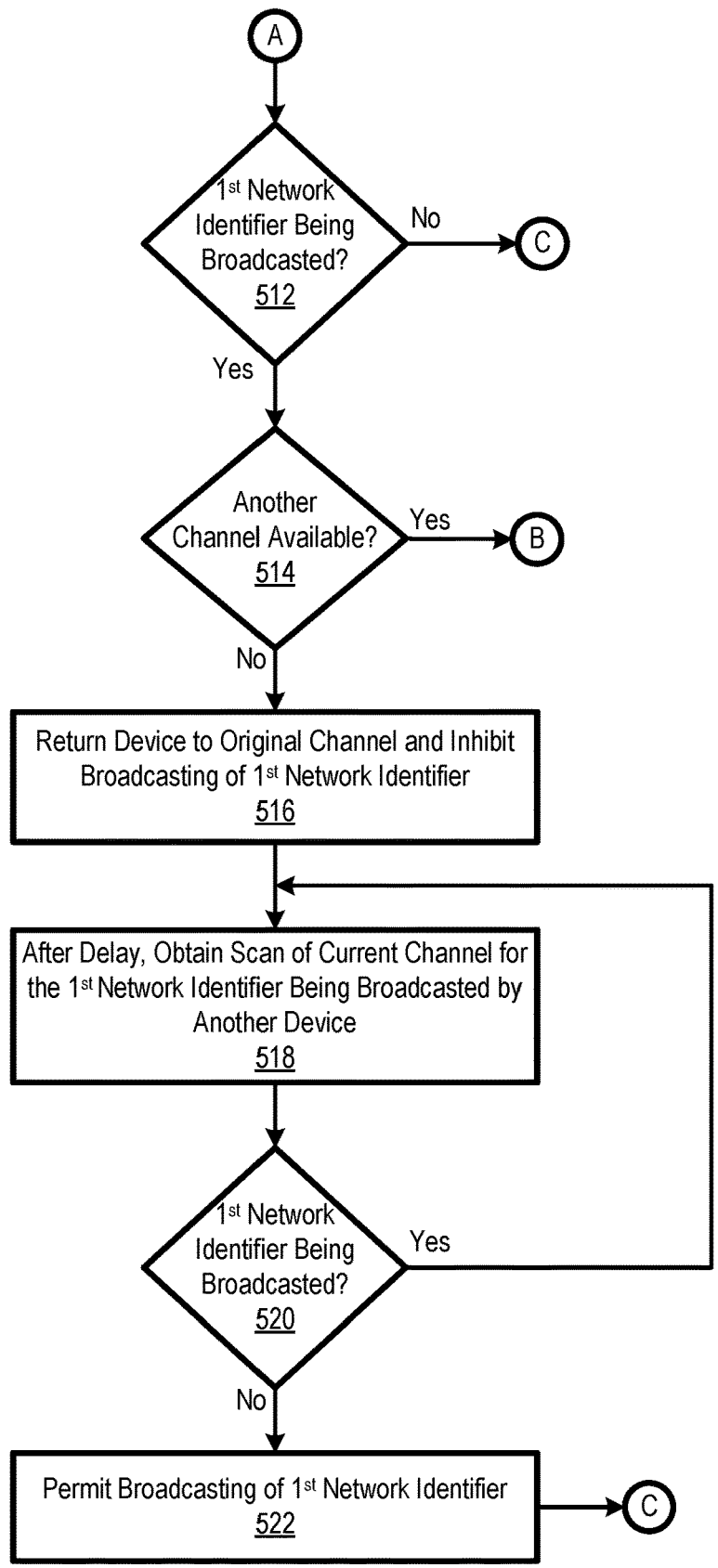

FIGS. 5A and 5B are a flow chart of a method 500 for reducing communication network congestion. In a decision block 502, method 500 determines whether a trigger condition has occurred, where the trigger condition is threshold condition for proceeding further with method 500. If the result of decision block 502 is yes, method proceeds to a block 504, and if the results of decision block 502 is no, method 500 returns to decision block 502. As such, method 500 remains at decision block 502 until the trigger condition has occurred. In one example of decision block 502, controller 216 determines whether one or more of the following trigger conditions has occurred: (a) power up of a wireless access point, (b) initialization of a wireless access point, (c) change in an operating environment of a wireless access point, (d) enabling of a new network identifier, and (e) change in operating channel of a wireless access point. In block 504, a communication device (e.g., a wireless access point) broadcasts a first network identifier (e.g., a SSID) on a current communication channel of the communication device. In one example of block 504, wireless access point 206 broadcasts network identifier ID-P a predetermined number of times (e.g., one time) on a first wireless communication channel.

In a block 506 of method 500, a scan of the current communication channel is obtained from the network device for presence of the first network identifier being broadcasted by another communication device. In one example of block 506, a scan of the first wireless communication channel is obtained from wireless access point 206 for presence of network identifier ID-P being broadcasted by another wireless access point. In a decision block 508, method 500 determines, based on the block 506 scan, whether the first network identifier is being broadcasted on the current communication channel by another communication device. In one example of decision block 508, controller 216 determines from the block 506 scan that network identifier ID-P is being broadcasted on the first wireless communication channel by a wireless access point other than wireless access point 206. In another example of decision block 508, controller 216 determines from the block 506 scan that network identifier ID-P is not being broadcasted on the first wireless communication channel by a wireless access point other than wireless access point 206. If the result of decision block 508 is yes, method 500 proceeds to a block 510, and if the result of decision block 508 is no, method 500 returns to block 504.

In block 510 the communication device switches to a new communication channel, and a scan of the new communication channel is obtained from the communication device for the first network identifier being broadcasted on the new communication channel. In one example of block 510, wireless access point 206 switches from the first wireless communication channel to a second wireless communication channel, and a scan of the second wireless communication channel is obtained from wireless access point 206 for presence of network identifier ID-P being broadcasted by another wireless access point. In a decision block 512, method 500 determines from the block 510 scan whether the first network identifier is being broadcasted on the new communication channel. In one example of decision block 512, controller 216 determines from the block 510 scan that network identifier ID-P is being broadcasted on the second wireless communication channel. In another example of decision block 512, controller 216 determines from the block 510 scan that network identifier ID-P is not being broadcasted on the second wireless communication channel. If the result of decision block 512 is no, method 500 returns to block 504, and if the result of decision block 512 is yes, method 500 proceeds to a decision block 514. In decision block 514, method 500 determines whether another communication channel is available. A communication channel is available, for example, if the communication channel is supported by the communication device in question. If the result of decision block 514 is yes, method 500 returns to block 510, and if the result of decision block 514 is no, method 500 proceeds to a block 516. In one example of decision block 514, controller 216 determines whether wireless access point 206 supports any wireless communication channels in addition to the first and second wireless communication channels.

In block 516, (a) the communication device returns to the original communication channel, i.e., its communication channel before the most-recent execution of block 510, and (b) broadcasting of the first network identifier by the communication device is inhibited. In one example of block 516, controller 216 causes wireless access point 206 to (a) return to the first wireless communication channel and (b) inhibit broadcasting of ID-P. In a block 518, after a delay, a scan of the current communication channel is obtained from the communication device for the first network identifier being broadcasted on the current communication channel. The delay is, for example, a predetermined delay, a random delay, or a delay that is a function of one or more communication environment parameters. In one example of block 518, a scan of the first wireless communication channel is obtained from wireless access point 206 for network identifier ID-P being broadcasted by another wireless access point.

In a decision block 520, method 500 determines from the scan of block 518 whether the first network identifier is being broadcasted on the current communication channel. In one example of decision block 520, controller 216 determines from the block 518 scan that network identifier ID-P is being broadcasted on the first wireless communication channel. In another example of decision block 520, controller 216 determines from the block 518 scan that network identifier ID-P is not being broadcasted on the first wireless communication channel. If the result of decision block 520 is yes, method 500 returns to block 518, and if the result of decision block 520 is no, method 500 proceeds to a block 522. In block 522, broadcasting of the first network identifier is permitted, and method 500 subsequently returns to block 504. In one example of block 522, controller 216 permits wireless access point 206 to broadcast network identifier ID-P.

Figure 6A:
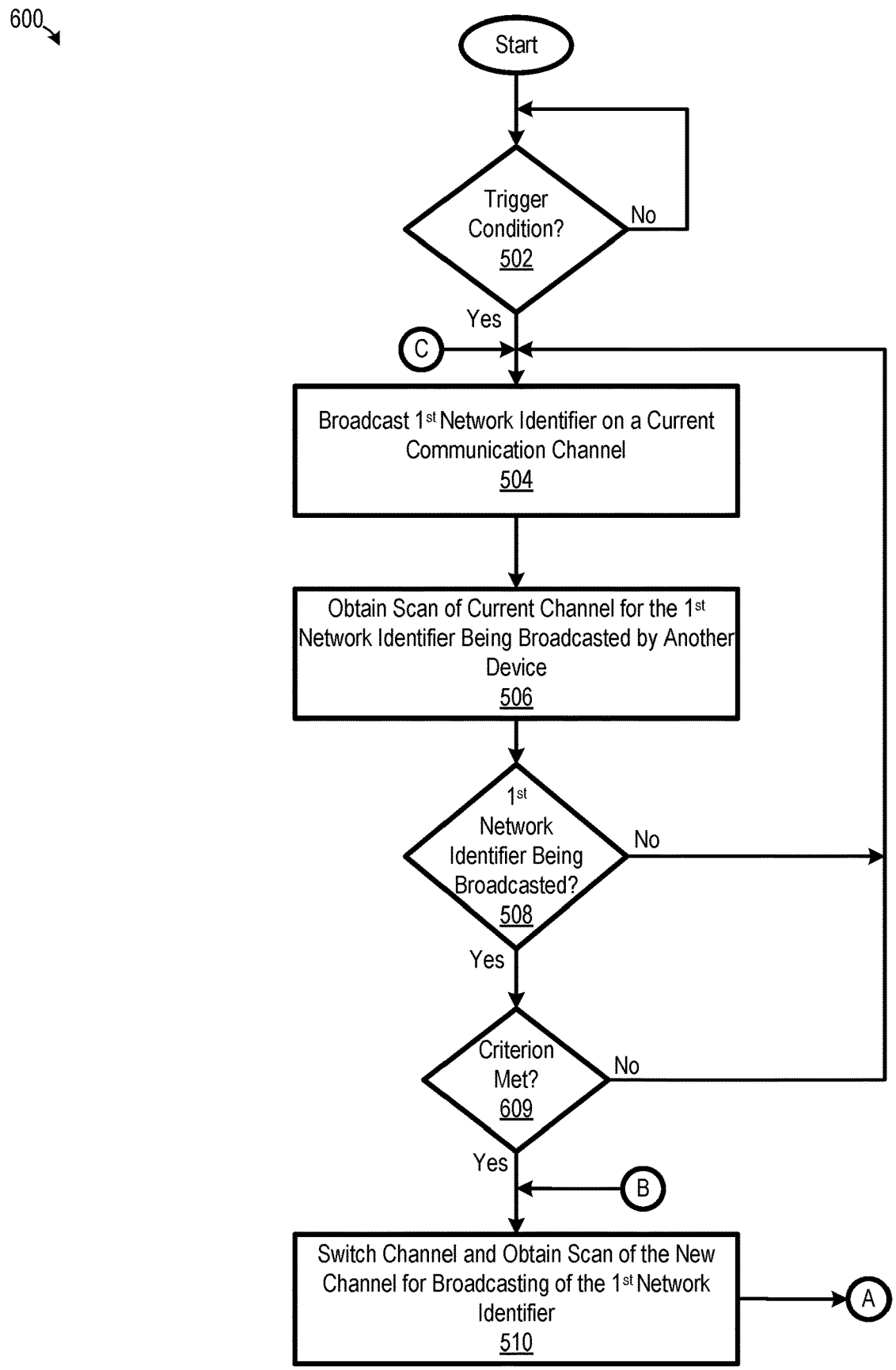
FIGS. 6A and 6B are a flow chart of an alternate embodiment of the method of FIGS. 5A and 5B.
Figure 6B:
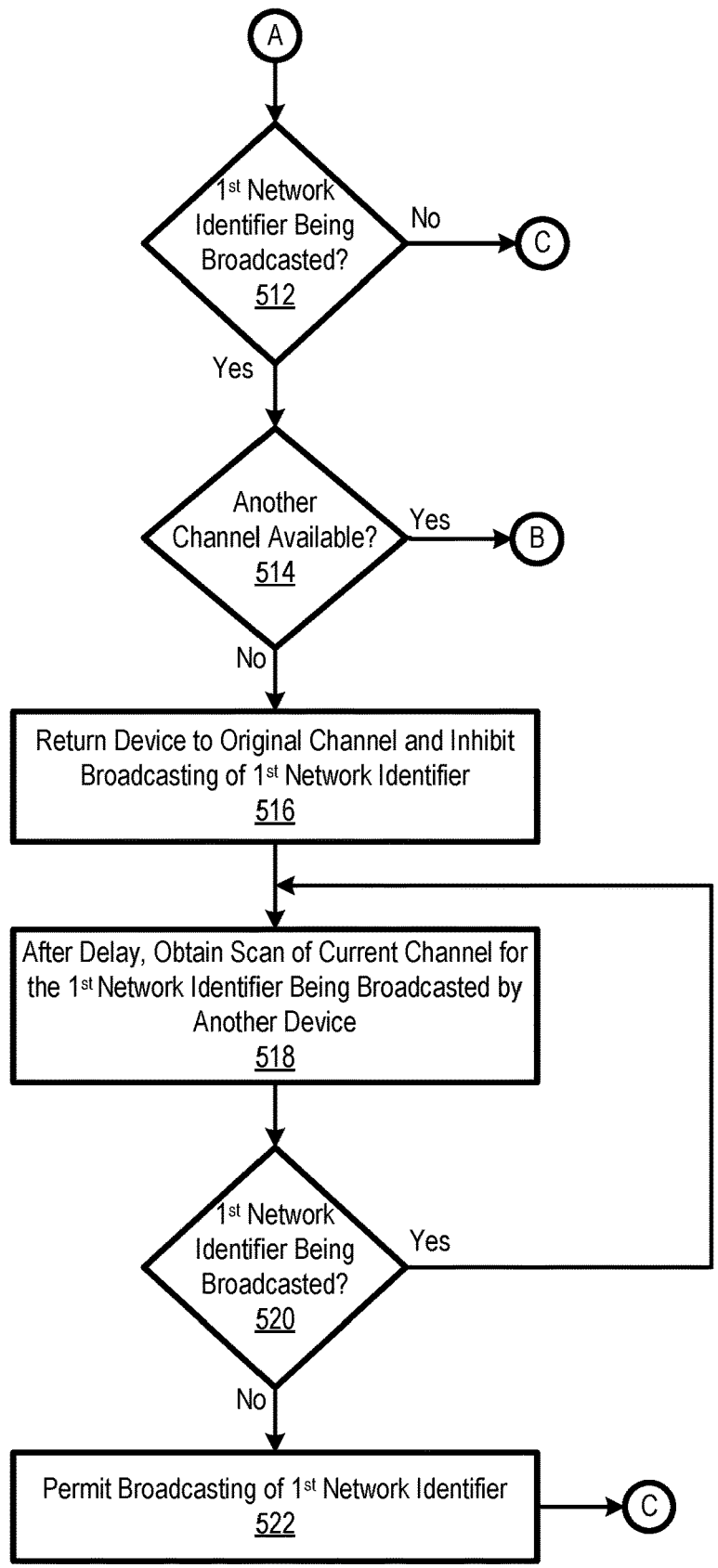

FIGS. 6A and 6B are a flow chart of a method 600 for reducing communication network congestion. Method 600 is an alternate embodiment of method 500 of FIGS. 5A and 5B further including a decision block 609 between blocks 508 and 510. In decision block 609, method 600 determines whether at least one predetermined criterion associated with the first network identifier is met. The predetermined criterion is an additional condition for inhibiting broadcast of the first network identifier. For example, the predetermined criterion may include (a) a communication signal carrying the first network identifier having a received signal strength of at least a threshold value at the communication device, (b) that the communication device is not currently serving any client of a communication network identified by the first network identifier, (c) that the communication device has not previously served any client of the communication network identified by the first network identifier within a predetermined amount of time. In one example of decision block 609, controller 216 determines whether one or more of the following criteria are met: (a) a communication signal carrying network identifier ID-P has a received signal strength of at least a threshold value at wireless access point 206, (b) wireless access point 206 is not currently serving any client of the community wireless network corresponding to network identifier ID-P, and (c) wireless access point 206 has not previously served any client of the community wireless network corresponding to ID-P within a predetermined amount of time. If the result of decision block 609 is no, method 600 returns to block 504, and if the result of decision block 609 is yes, method 600 proceeds to block 510.

Figure 7A:
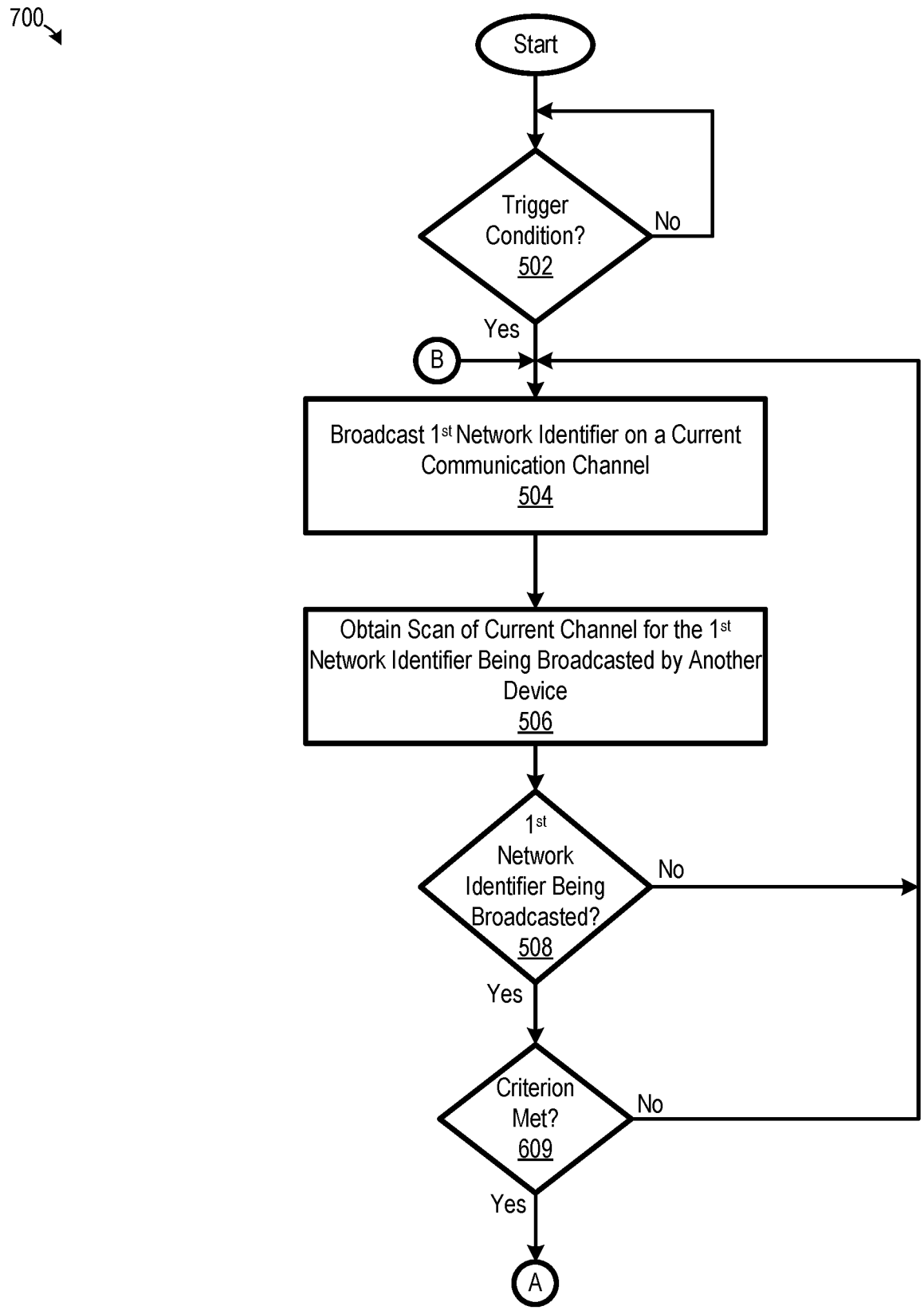
FIGS. 7A and 7B are a flow chart of an alternate embodiment of the method of FIGS. 6A and 6B.
Figure 7B:
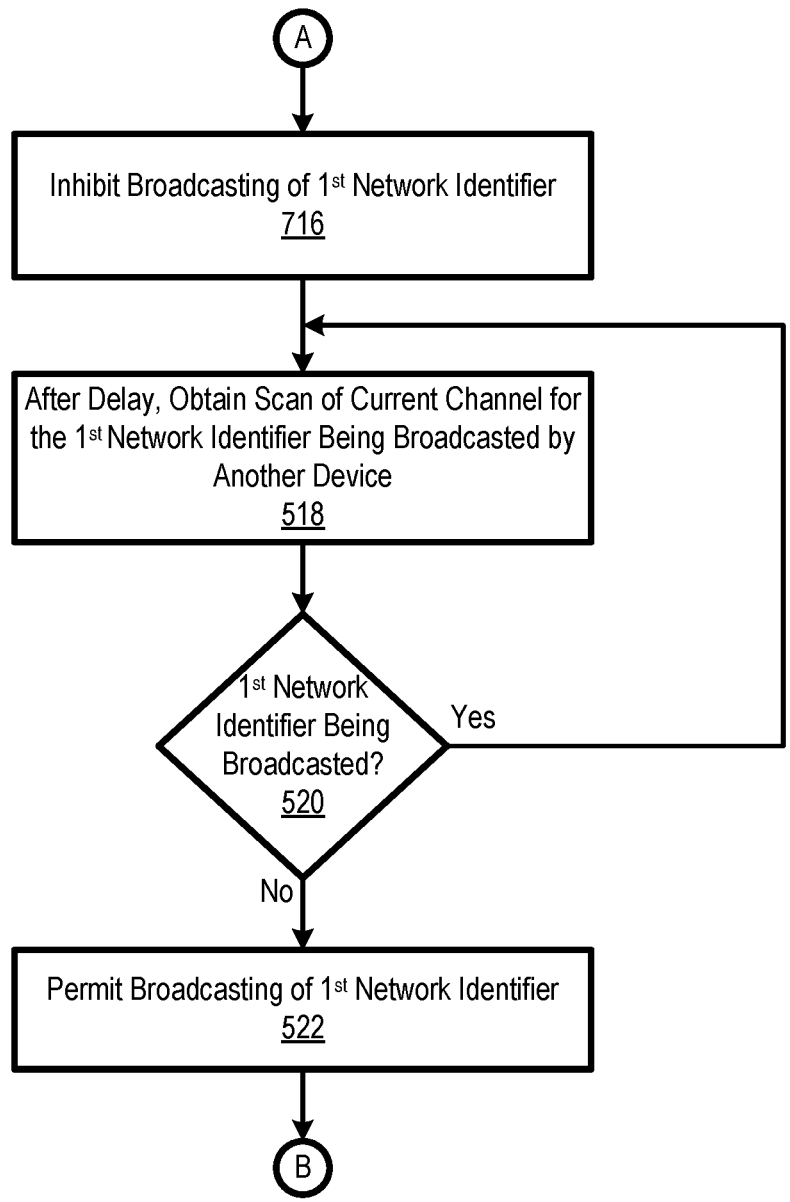

Either of method 500 or 600 could be modified to omit channel switching. For example, FIGS. 7A and 7B are a flow chart of a method 700 for reducing communication network congestion. Method 700 is an alternate embodiment of method 600 of FIGS. 6A and 6B with channel switching omitted. Method 700 includes blocks 502, 504, 506, 508, 609, 518, 520, and 522, which are executed in the same manner as discussed above with respect to FIGS. 5A, 5B, 6A, and 6B. However, blocks 510, 512, 514, and 516 are replaced with a single block 716 between decision block 609 and block 518. In block 716, broadcasting of the first network identifier by the communication device is inhibited on the first communication channel. In one example of block 716, controller 216 inhibits broadcasting of ID-P by access point 206 on the first communication channel. Accordingly, method 700 achieves the same function as method 600 but without the possibility of channel switching.

Figure 8:
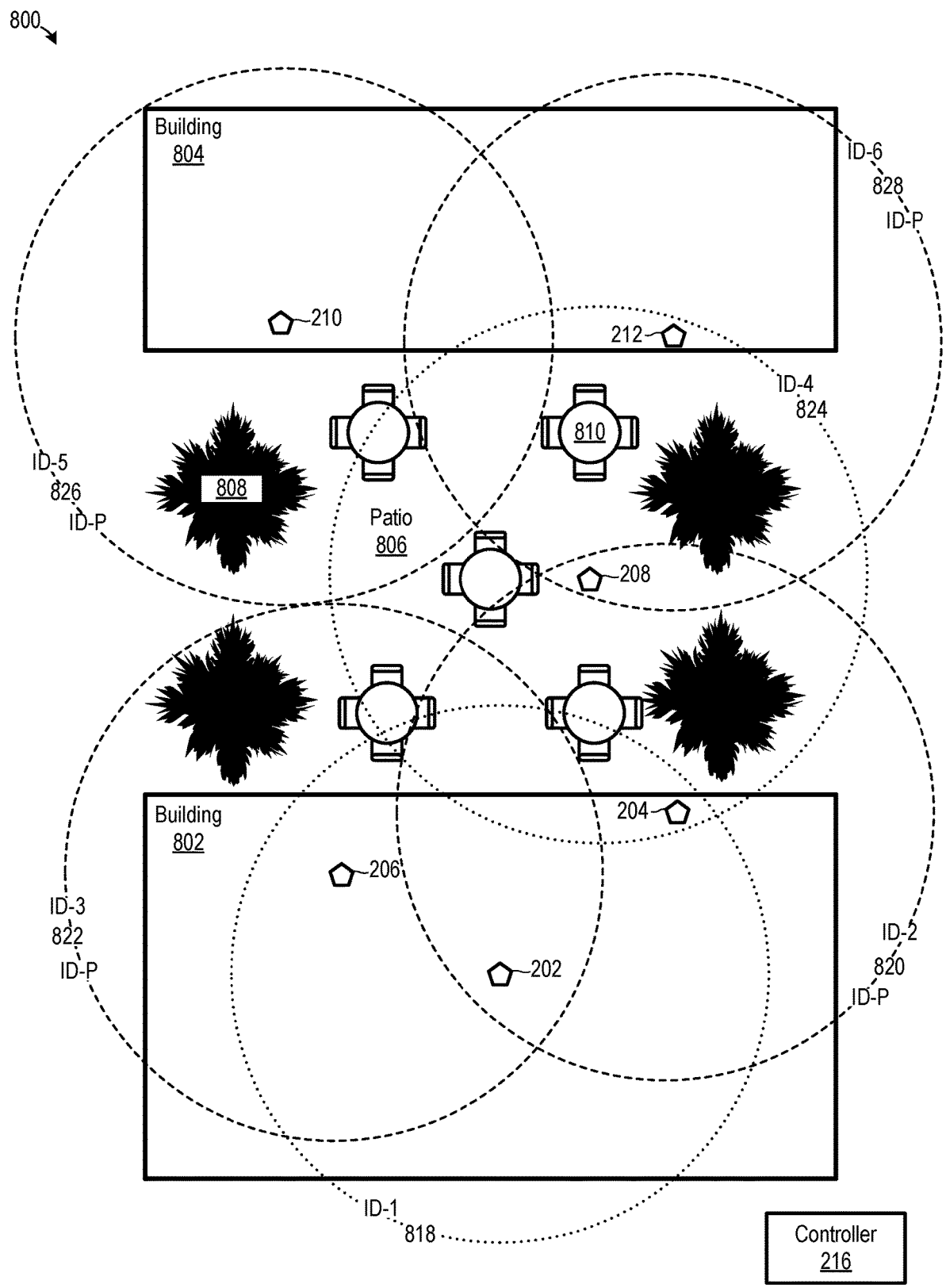
FIG. 8 is an illustration of an alternate embodiment of the FIG. 2 wireless communication environment.

Referring again to FIG. 2, wireless communication environment 200 could be modified so that one or more wireless access points are located outside and/or so that two or more wireless access points are located in different buildings. For example, FIG. 8 is a top plan view illustration of a wireless communication environment 800 which is an alternate embodiment wireless communication environment 200. Wireless communication environment 800 includes two buildings 802 and 804, as well as patio 806 between the two buildings, in place of building 214 of FIG. 2. FIG. 8 further depicts trees 808 and furniture 810 on patio 806, although only one instance of each of these two elements is labeled in FIG. 8. Wireless access points 202, 204, and 206 are located within building 802, and wireless access points 210 and 212 are located within building 804. Wireless access point 208 is located on patio 806. Wireless access points 202, 204, 206, 208, 210, and 212 have respective coverages areas 818, 820, 822, 824, 826, and 828 in wireless communication environment 800. Although coverages areas 818, 820, 822, 824, 826, and 828 are illustrated as having circular shapes, actual coverage areas may be, and often will be, non-circular, for reasons analogous to those discussed above with respect to FIG. 1.

In a manner analogous to that discussed above with respect to FIG. 2, controller 216 is configured to inhibit broadcasting of network identifier ID-P by one or more of the wireless access points in wireless communication environment 800, to help prevent unnecessary broadcasting of network identifier ID-P by two or more wireless access points having overlapping coverage areas. For example, controller 216 may execute any one of methods 300, 400, 500, 600, or 700 with respect wireless communication environment 800. In the FIG. 8 example, controller 216 controls wireless access points 202, 204, 206, 208, 210, and 212 such that (a) broadcasting of network identifier ID-P is permitted for wireless access points 204, 206, 210, and 212, and (b) broadcasting of network identifier ID-P is inhibited for wireless access points 202 and 208. Consequently, each of wireless access points 204, 206, 210, and 212 broadcasts network identifier ID-P, as symbolically shown in FIG. 8 by their respective coverage areas 820, 822, 826, and 828 being illustrated in heavy dashed lines and labeled with ID-P. Additionally, wireless access points 202 and 208 do not broadcast network identifier ID-P, as symbolically shown in FIG. 8 by their respective coverage areas 818 and 824 being illustrated in light dashed lines and not labeled with ID-P.

Figure 9:
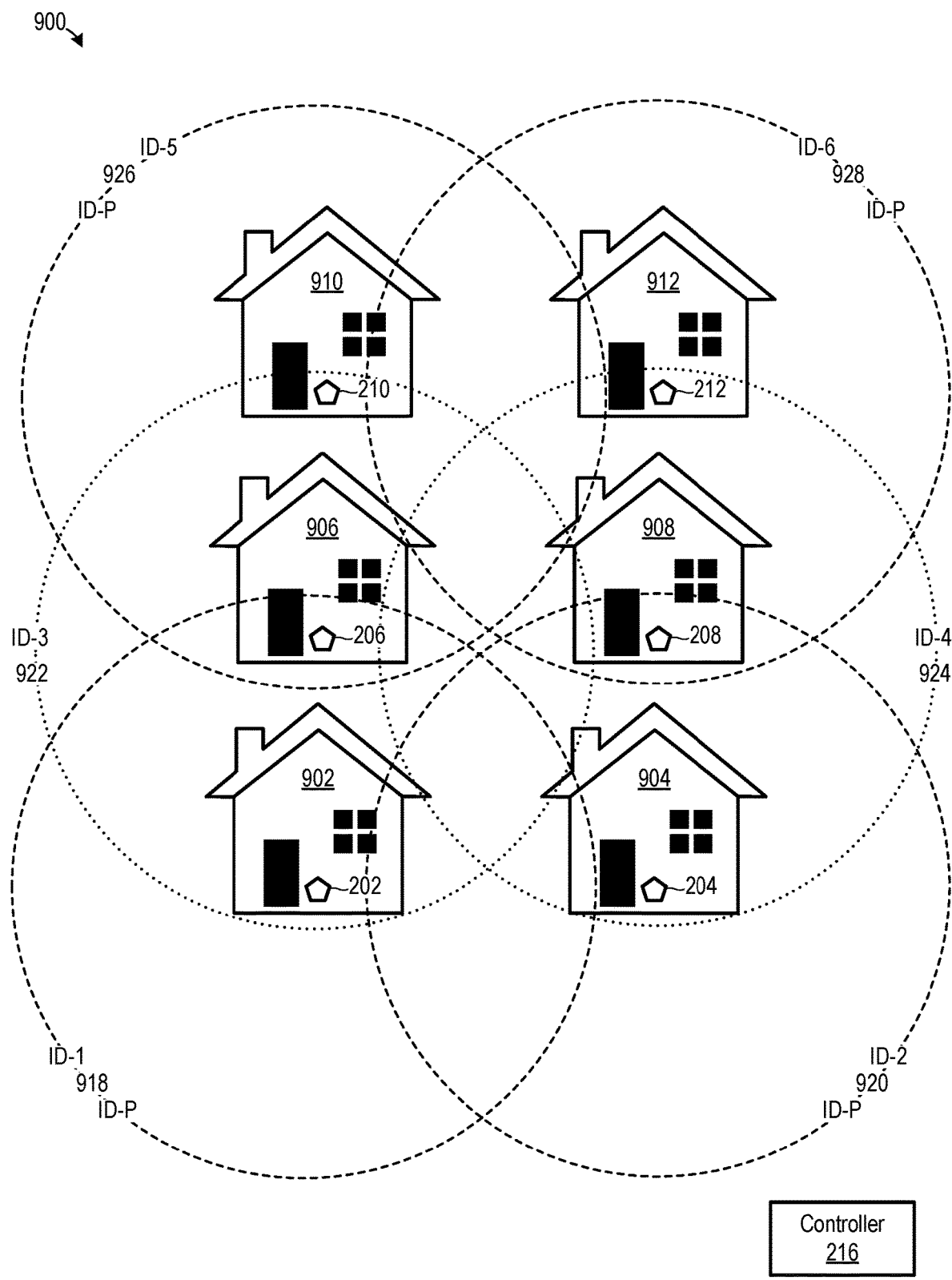
FIG. 9 is an illustration of another alternate embodiment of the FIG. 2 wireless communication environment.

FIG. 9 is a top plan view illustration of a wireless communication environment 900 which is another alternate embodiment wireless communication environment 200. Wireless communication environment 900 includes six separate houses 902, 904, 906, 908, 910, and 912 in place of building 214 of FIG. 2. Wireless access points 202, 204, 206, 208, 210, and 212 are located within houses 902, 904, 906, 908, 910, and 912, respectively. Wireless access points 202, 204, 206, 208, 210, and 212 have respective coverages areas 918, 920, 922, 924, 926, and 928 in wireless communication environment 900. Although coverages areas 918, 920, 922, 924, 926, and 928 are illustrated as having circular shapes, actual coverage areas may be, and often will be, non-circular, for reasons analogous to those discussed above with respect to FIG. 1.

In a manner analogous to that discussed above with respect to FIG. 2, controller 216 is configured to inhibit broadcasting of network identifier ID-P by one or more of the wireless access points in wireless communication environment 900, to help prevent unnecessary broadcasting of network identifier ID-P by two or more wireless access points having overlapping coverage areas. For example, controller 216 may execute any one of methods 300, 400, 500, 600, or 700 with respect wireless communication environment 900. In the FIG. 9 example, controller 216 controls wireless access points 202, 204, 206, 208, 210, and 212 such that (a) broadcasting of network identifier ID-P is permitted for wireless access points 202, 204, 210, and 212, and (b) broadcasting of network identifier ID-P is inhibited for wireless access points 206 and 208. Consequently, each of wireless access points 202, 204, 210, and 212 broadcasts network identifier ID-P, as symbolically shown in FIG. 9 by their respective coverage areas 918, 920, 926, and 928 being illustrated in heavy dashed lines and labeled with ID-P. Additionally, wireless access points 206 and 208 do not broadcast network identifier ID-P, as symbolically shown in FIG. 9 by their respective coverage areas 922 and 924 being illustrated in light dashed lines and not labeled with ID-P.

Figure 10:
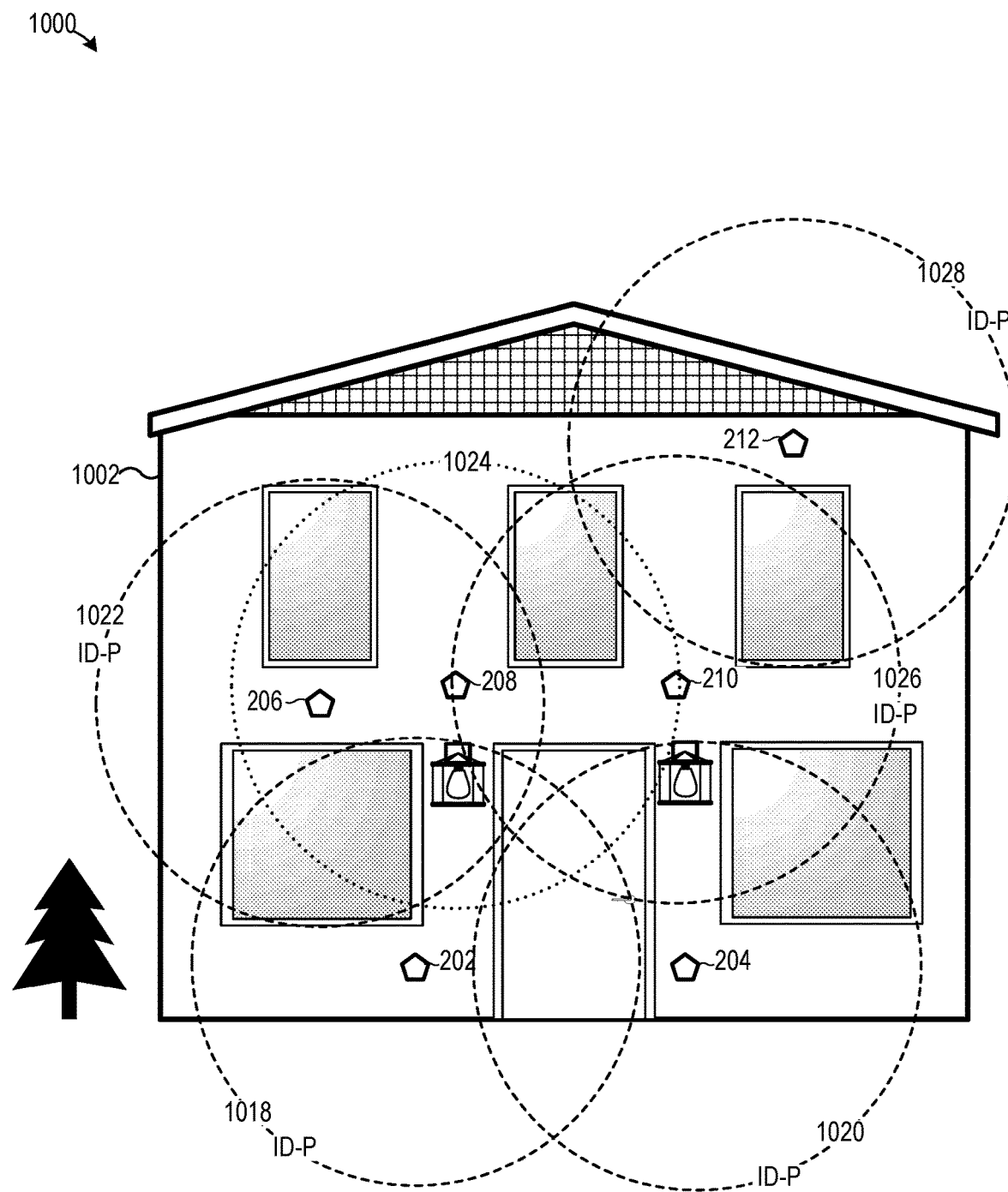
FIG. 10 is an illustration of another alternate embodiment of the FIG. 2 wireless communication environment.

FIG. 10 is an illustration of a wireless communication environment 1000 which is another alternate embodiment wireless communication environment 200. Wireless communication environment 1000 includes a house in place of building 214 of FIG. 2. Each of wireless access points 202, 204, 206, 208, 210, and 212 is located within house 1002. Wireless communication environment 1000 could be modified so that house 1002 is replaced with a different type of building and/or multiple buildings without departing from the scope hereof. Additionally, wireless communication environment 1000 could be modified so that some or all of its wireless access points are located outdoors. Wireless access points 202, 204, 206, 208, 210, and 212 have respective coverages areas 1018, 1020, 1022, 1024, 1026, and 1028 in wireless communication environment 1000. Although coverages areas 1018, 1020, 1022, 1024, 1026, and 1028 are illustrated as having circular shapes, actual coverage areas may be, and often will be, non-circular, for reasons analogous to those discussed above with respect to FIG. 1.

In contrast with wireless communication environment 200 of FIG. 2, wireless access points 202, 204, 206, 208, 210, and 212 in wireless communication environment 1000 are configured to support only a single communication network, i.e., the communication network corresponding to network identifier ID-P. Accordingly, wireless access points 202, 204, 206, 208, 210, and 212 do not broadcast network identifiers for private communication networks, in wireless communication environment 1000.

In a manner analogous to that discussed above with respect to FIG. 2, controller 216 is configured to inhibit broadcasting of network identifier ID-P by one or more of the wireless access points in wireless communication environment 1000, to help prevent unnecessary broadcasting of network identifier ID-P by two or more wireless access points having overlapping coverage areas. For example, controller 216 may execute any one of methods 300, 400, 500, 600, or 700 with respect wireless communication environment 1000. In the FIG. 10 example, controller 216 controls wireless access points 202, 204, 206, 208, 210, and 212 such that (a) broadcasting of network identifier ID-P is permitted for wireless access points 202, 204, 206, 210, and 212, and (b) broadcasting of network identifier ID-P is inhibited for wireless access point 208. Consequently, each of wireless access points 202, 204, 206, 210, and 212 broadcasts network identifier ID-P, as symbolically shown in FIG. 10 by their respective coverage areas 1018, 1020, 1022, 1026, and 1028 being illustrated in heavy dashed lines and labeled with ID-P. Additionally, wireless access point 208 does not broadcast network identifier ID-P, as symbolically shown in FIG. 10 by its coverage area 1024 being illustrated in light dashed lines and not labeled with ID-P Although the new systems and methods are primarily discussed above in the context of wireless communication networks, the new systems and methods are not limited to use in wireless communication networks but also could be used in wireline communication networks where multiple communication devices (e.g., electrical or optical transceivers) share a common communication medium, such as a common electrical cable or a common electrical cable.

Combinations of Features

Features described above may be combined in various ways without departing from the scope hereof. The following examples illustrate some possible combinations.

(A1) A method for reducing communication network congestion includes (1) obtaining, from a first communication device, a scan of a first communication channel for presence of a first network identifier, (2) determining, from the scan of the first communication channel, that the first network identifier is being broadcasted on the first communication channel by a communication device other than the first communication device, and (3) in response to determining that the first network identifier is being broadcasted on the first communication channel, inhibiting broadcasting of the first network identifier on the first communication channel by the first communication device.

(A2) The method denoted as (A1) may further include, in response to determining that the first network identifier is being broadcasted on the first communication channel, obtaining, from the first communication device, a scan of a second communication channel for presence of the first network identifier.

(A3) The method denoted as (A2) may further include (1) determining, from the scan of the second communication channel, that the first network identifier is being broadcasted on the second communication channel by a communication device other than the first communication device, and (2) in response to determining that the first network identifier is being broadcasted on the second communication channel, inhibiting broadcasting of the first network identifier on the second communication channel by the first communication device.

(A4) The method denoted as (A2) may further include (1) determining, from the scan of the second communication channel, that the first network identifier is not being broadcasted on the second communication channel, and (2) in response to determining that the first network identifier is not being broadcasted on the second communication channel, permitting broadcasting of the first network identifier on the second communication channel by the first communication device.

(A5) In any one of the methods denoted as (A1) through (A4), inhibiting broadcasting of the first network identifier on the first communication channel by the first communication device may include one of (a) causing the first communication device to not begin broadcasting the first network identifier on the first communication channel, (b) causing the first communication device to stop broadcasting the first network identifier on the first communication channel, and (c) causing the first communication device to reduce a frequency of broadcasting the first network identifier on the first communication channel.

(A6) Any one of the methods denoted as (A1) through (A5) may further include (1) obtaining, from the first communication device, a second scan of the first communication channel for presence of the first network identifier, (2) determining, from the second scan of the first communication channel, that the first network identifier is no longer being broadcasted on the first communication channel by a communication device other than the first communication device, and (3) in response to determining that the first network identifier is no longer being broadcasted on the first communication channel, permitting broadcasting of the first network identifier on the first communication channel by the first communication device.

(A7) In any one of the methods denoted as (A1) through (A6), (1) the first communication device may be a wireless communication device, (2) the first communication channel may be a wireless communication channel, and (3) the first network identifier may identify one or more wireless communication networks.

(A8) In the method denoted as (A7), the first communication device may be a Wi-Fi wireless communication device, and the first communication channel may be a Wi-Fi wireless communication channel.

(A9) In the method denoted as (A8), the first network identifier may include a Wi-Fi Service Set Identifier (SSID).

(A10) In any one of the methods denoted as (A7) through (A9), the one or more wireless communication networks may include a community wireless communication network.

(B1) A method for reducing communication network congestion includes (1) obtaining, from a first communication device, a scan of a first communication channel for presence of a first network identifier, (2) determining, from the scan of the first communication channel, that the first network identifier is being broadcasted on the first communication channel by a communication device other than the first communication device, (3) determining whether at least one predetermined criterion associated with the first network identifier is met, and (4) in response to determining that (a) the first network identifier is being broadcasted on the first communication channel and (b) the at least one predetermined criterion associated with the first network identifier is met, inhibiting broadcasting of the first network identifier on the first communication channel by the first communication device.

(B2) In the method denoted as (B1), the at least one predetermined criterion associated with the first network identifier may include a received signal strength of a communication signal carrying the first network identifier being at least a minimum threshold value at the first communication device.

(B3) In any one of the methods denoted as (B1) and (B2), the at least one predetermined criterion associated with the first network identifier may include that the first communication device is not currently serving any client of a communication network identified by the first network identifier.

(B4) In any one of the methods denoted as (B1) through (B3), the at least one predetermined criterion associated with the first network identifier may include that the first communication device has not previously served any client of a communication network identified by the first network identifier within a predetermined time frame.

(B5) Any one of the methods denoted as (B1) through (B4) may further include, in response to determining that the first network identifier is being broadcasted on the first communication channel, obtaining, from the first communication device, a scan of a second communication channel for presence of the first network identifier.

(B6) The method denoted as (B5) may further include (1) determining, from the scan of the second communication channel, that the first network identifier is not being broadcasted on the second communication channel, and (2) in response to determining that the first network identifier is not being broadcasted on the second communication channel, permitting broadcasting of the first network identifier on the second communication channel by the first communication device.

(B7) In any one of the methods denoted as (B1) through (B6), inhibiting broadcasting of the first network identifier on the first communication channel by the first communication device may include one of (a) causing the first communication device to not begin broadcasting the first network identifier on the first communication channel, (b) causing the first communication device to stop broadcasting the first network identifier on the first communication channel, and (c) causing the first communication device to reduce a frequency of broadcasting the first network identifier on the first communication channel.

(B8) In any one of the methods denoted as (B1) through (B7), (1) the first communication device may be a wireless communication device, (2) the first communication channel may be a wireless communication channel, and (3) the first network identifier may identify one or more wireless communication networks.

(B9) In the method denoted as (B8), the first communication device may be a Wi-Fi wireless communication device, and the first communication channel may be a Wi-Fi wireless communication channel.

(B10) In the method denoted as (B 9), the first network identifier may include a Wi-Fi Service Set Identifier (SS ID).

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for reducing communication network congestion, the method comprising:
   obtaining, from a first communication device, a scan of a first communication channel for presence of a first network identifier;
   determining, from the scan of the first communication channel, that the first network identifier is being broadcasted on the first communication channel by a communication device other than the first communication device;
   in response to determining from the scan of the first communication channel that the first network identifier is being broadcasted on the first communication channel, inhibiting broadcasting of the first network identifier on the first communication channel by the first communication device at least partially by reducing how frequently the first communication device broadcasts the first network identifier on the first communication channel, without stopping the first communication device from broadcasting the first network identifier on the first communication channel;
   obtaining, from the first communication device, a second scan of the first communication channel for presence of the first network identifier;
   determining, from the second scan of the first communication channel, that the first network identifier is no longer being broadcasted on the first communication channel by a communication device other than the first communication device; and
   in response to determining from the second scan of the first communication channel that the first network identifier is no longer being broadcasted on the first communication channel, permitting broadcasting of the first network identifier on the first communication channel by the first communication device.

2. The method of claim 1, further comprising, in response to determining from the scan of the first communication channel that the first network identifier is being broadcasted on the first communication channel, obtaining, from the first communication device, a scan of a second communication channel for presence of the first network identifier.

3. The method of claim 2, further comprising:
   determining, from the scan of the second communication channel, that the first network identifier is being broadcasted on the second communication channel by a communication device other than the first communication device; and
   in response to determining from the scan of the second communication channel that the first network identifier is being broadcasted on the second communication channel, inhibiting broadcasting of the first network identifier on the second communication channel by the first communication device.

4. The method of claim 2, further comprising:
   determining, from the scan of the second communication channel, that the first network identifier is not being broadcasted on the second communication channel; and
   in response to determining from the scan of the second communication channel that the first network identifier is not being broadcasted on the second communication channel, permitting broadcasting of the first network identifier on the second communication channel by the first communication device.

5. The method of claim 1, wherein:
the first communication device is a wireless communication device;
the first communication channel is a wireless communication channel; and
the first network identifier identifies one or more wireless communication networks.

6. The method of claim 5, wherein:
the first communication device is a Wi-Fi wireless communication device; and
the first communication channel is a Wi-Fi wireless communication channel.

7. The method of claim 5, wherein the one or more wireless communication networks comprise a community wireless communication network.

8. The method of claim 6, wherein the first network identifier comprises a Wi-Fi Service Set Identifier (SSID).

9. A controller for reducing communication network congestion, the controller configured to:
obtain, from a first communication device, a scan of a first communication channel for presence of a first network identifier;
determine, from the scan of the first communication channel, that the first network identifier is being broadcasted on the first communication channel by a communication device other than the first communication device;
in response to determining from the scan of the first communication channel that the first network identifier is being broadcasted on the first communication channel, inhibit broadcasting of the first network identifier on the first communication channel by the first communication device at least partially by reducing how frequently the first communication device broadcasts the first network identifier on the first communication channel, without stopping the first communication device from broadcasting the first network identifier on the first communication channel;
obtain, from the first communication device, a second scan of the first communication channel for presence of the first network identifier;
determine, from the second scan of the first communication channel, that the first network identifier is no longer being broadcasted on the first communication channel by a communication device other than the first communication device; and
in response to determining from the second scan of the first communication channel that the first network identifier is no longer being broadcasted on the first communication channel, permit broadcasting of the first network identifier on the first communication channel by the first communication device.

10. The controller of claim 9, wherein the controller is further configured to, in response to determining from the scan of the first communication channel that the first network identifier is being broadcasted on the first communication channel, obtain, from the first communication device, a scan of a second communication channel for presence of the first network identifier.

11. The controller of claim 10, wherein the controller is further configured to:
determine, from the scan of the second communication channel, that the first network identifier is being broadcasted on the second communication channel by a communication device other than the first communication device; and
in response to determining from the scan of the second communication channel that the first network identifier is being broadcasted on the second communication channel, inhibit broadcasting of the first network identifier on the second communication channel by the first communication device.

12. The controller of claim 10, wherein the controller is further configured to:
determine, from the scan of the second communication channel, that the first network identifier is not being broadcasted on the second communication channel; and
in response to determining from the scan of the second communication channel that the first network identifier is not being broadcasted on the second communication channel, permit broadcasting of the first network identifier on the second communication channel by the first communication device.

13. The controller of claim 9, wherein:
the first communication device is a wireless communication device;
the first communication channel is a wireless communication channel; and
the first network identifier identifies one or more wireless communication networks.

14. The controller of claim 13, wherein:
the first communication device is a Wi-Fi wireless communication device; and
the first communication channel is a Wi-Fi wireless communication channel.

15. The controller of claim 13, wherein the one or more wireless communication networks comprise a community wireless communication network.

16. The controller of claim 14, wherein the first network identifier comprises a Wi-Fi Service Set Identifier (SSID).

\* \* \* \* \*